(12) United States Patent
Sood et al.

(10) Patent No.: US 10,072,975 B2
(45) Date of Patent: Sep. 11, 2018

(54) WEARABLE TO MONITOR EXPOSURE TO UV RADIATION

(71) Applicant: Stella Wearables, Inc., Chula Vista, CA (US)

(72) Inventors: Nishant Sood, Haryana (IN); Nicolas Gonzalez, Chula Vista, CA (US); Enrique Guadarrama, Chula Vista, CA (US)

(73) Assignee: Stella Wearables, Inc., San Diego, CA (US)

( * ) Notice: Subject to any disclaimer, the term of this patent is extended or adjusted under 35 U.S.C. 154(b) by 0 days.

(21) Appl. No.: 15/257,812

(22) Filed: Sep. 6, 2016

(65) Prior Publication Data

US 2017/0069192 A1 Mar. 9, 2017

Related U.S. Application Data

(60) Provisional application No. 62/214,803, filed on Sep. 4, 2015.

(51) Int. Cl.
*G08B 17/12* (2006.01)
*G01J 1/42* (2006.01)
*H04M 1/725* (2006.01)
*G08B 21/02* (2006.01)

(52) U.S. Cl.
CPC ......... *G01J 1/429* (2013.01); *H04M 1/72569* (2013.01); *G08B 21/02* (2013.01)

(58) Field of Classification Search
CPC ...... G01J 1/429; G08B 21/02; H04M 1/72569
See application file for complete search history.

(56) References Cited

U.S. PATENT DOCUMENTS

| | | | |
|---|---|---|---|
| 9,068,887 B1 * | 6/2015 | Bennouri | G01J 1/429 |
| 2015/0102208 A1 * | 4/2015 | Appelboom | G06F 19/3481 250/208.2 |
| 2016/0313176 A1 * | 10/2016 | Lee | G01J 1/429 |

* cited by examiner

*Primary Examiner* — Omeed Alizada
(74) *Attorney, Agent, or Firm* — Troutman Sanders LLP

(57) ABSTRACT

A wearable or attachable device comprising a UV sensor configured to provide user-specific burn rate times providing an indication to the user when they are exposing themselves to harmful levels of UV radiation.

19 Claims, 5 Drawing Sheets

WEARABLE TO MONITOR EXPOSURE TO UV RADIATION

CROSS-REFERENCE TO RELATED APPLICATION

This application claims priority to and the benefit of U.S. Provisional Patent Application No. 62/214,803 filed on Sep. 4, 2015 and titled "Wearable To Monitor Exposure To UV Radiation," the disclosure of which is incorporated herein by reference in its entirety for all purposes.

TECHNICAL FIELD

The subject matter described herein relates to a wearable device and in particular to a wearable device that can monitor a wearers exposure to ultraviolet (UV) radiation.

BACKGROUND

Overexposure to UVA and UVB rays from the sun can cause many problems such as wrinkling, premature aging, sunspots, and even the deadliest form of skin cancer, Melanoma. Many people are unaware of when they have become overexposed.

Clothing does not prevent UV rays from reaching the skin and causing damage. A white shirt has the SPF of about 7, when wet the protection offered drops to about 3. One way to detect if a piece of clothing fully protects a person is holding it up to the sun, if any light goes through it can still be harmful. Any person, especially a child, is susceptible to the damage of the sun's UV rays. 10% of the work force in the United States work outdoors.

People that spend time on the beach need to be extra careful of their exposure to the sun's UV radiation. Even when in shade, sand can reflect roughly 17% of the sun's UV rays. Also, even when living in areas where there is relatively little Sunlight, the UV rays can still damage skin year-round. UVB rays cause sunburn and are the most noticeable, but both UVA and UVB rays can penetrate through clouds, so even on a cloudy day the sun can be very harmful to the skin. Furthermore, residing or spending time in areas with snow, it is a common necessity to use broad-spectrum sunscreen because snow reflects roughly 80% of the sun's UV. Reflected UV rays have a cumulative effect on the damage afforded to a person.

UVA rays can be harmful even indoors. UVA rays penetrate through glass allowing them to be harmful even when indoors. In limited quantities, UVB rays can be beneficial to life, for example in the intake of Vitamin D, however overexposure can be very harmful to humans, especially as the ozone layer gets more depleted more UVB rays penetrate and reach ground level and create greater harm.

People have limited knowledge or sense of their exposure to UVA and UVB rays. The ever-changing weather patterns, the constant moving from shade, to sunny areas, and time spent indoors compared to outdoors, make determining one's exposure to UVA and UVB rays almost impossible.

SUMMARY

Implementations of the current subject matter can include methods, systems, articles, and other embodiments consistent with the subject matter described herein.

In one aspect, a wearable device to monitor radiation exposure of a wearer of the wearable device is provided. The wearable device can include a radiation sensor configured to output a signal based on the instantaneous ultraviolet radiation detected at the radiation sensor. An output device can be provided and configured to provide an alert to a wearer of the wearable device. The wearable device can include a memory that includes one or more wearer characteristics and a processor configured to execute machine readable instructions that cause the processor to perform one or more functions. The functions can include storing, in the memory, information indicative of the instantaneous ultraviolet radiation detected, over time, at the radiation sensor. A total exposure, of the wearer, to ultraviolet radiation can be determined based on monitoring, over time, the instantaneous ultraviolet radiation detected at the radiation sensor. A determination of whether the total exposure has reached a threshold amount can be made by the wearable device and/or the remote device. The output device can be caused to provide an alert to the wearer in response to determining that total exposure has reached a threshold amount of exposure to ultraviolet radiation.

In some variations, the one or more wearer characteristics can include a burn rate for the wearer. The output device can include a light, a display, a vibrating motor, or the like. The wearable device can include a heart rate monitor, one or more movement sensors, a location sensor, or the like.

The wearable device can include a short-range transceiver configured to transmit and receive data with a mobile computing device. The mobile computing device can be configured to store data received from the wearable and facilitate presenting the data received from the wearable to a medical service provider.

The mobile computing device can include a processor and a memory for storing machine-readable instructions, which when executed by the processor, cause the processor to perform one or more operations. The operations can include facilitating selection and/or entry of a skin type by the wearer, facilitate selection and/or entry of a protection factor by the wearer and determining the threshold amount of ultraviolet radiation for the wearer.

The operations can further comprise transmitting, from the mobile computing device to the wearable, the threshold amount of ultraviolet radiation for the wearer for storing in the memory as a user characteristic.

Data indicative of the instantaneous ultraviolet radiation detected, over time, at the radiation sensor of the wearable can be received at the mobile computing device. The data can allow a determination of the amount of Vitamin D received by the wearer.

In another aspect a method is provided. The method can include receiving, through a graphical user interface of a mobile computing device, an indication of one or more wearer characteristics of a wearer of a wearable device. A radiation sensor of the wearable device can be calibrated, the radiation sensor configured to measure ultraviolet radiation. The calibration can be performed by a mobile computing device. An amount of ultraviolet radiation can be that the wearer of the wearable device is exposed to can be monitored. The wearer of the wearable device can be alerted in response to the wearer being exposed to a threshold amount of ultraviolet radiation for the wearer, the threshold amount of ultraviolet radiation for the wearer based on the one or more wearer characteristics.

The one or more user characteristics can comprise an indication of a skin type of a wearer of a wearable device, an indication of a level of sun protection worn by the wearer of the wearable device, an indication of the clothing worn by the user, or the like.

Calibrating the radiation sensor can include obtaining, at the mobile computing device, a location of the mobile computing device, obtaining, at the mobile computing device, an indication of the amount of ultraviolet radiation incident at the location of the mobile computing device, receiving, at the mobile computing device from the wearable device, an indication of the amount of ultraviolet radiation incident on the radiation sensor, determining, at the mobile computing device, a calibration amount for the radiation sensor of the wearable device based on the obtained indication of the amount of ultraviolet radiation incident at the location of the mobile computing device.

While the wearable described herein resembles a bracelet, the current subject matter contemplates a wearable in the form of watches, headphones, helmets, hats, finger rings, jewelry pieces, sunglasses, clothing backpacks, and the like. Furthermore, the currently described subject matter can be implemented in articles that are not typically referred to as wearables. The currently described subject matter can be implemented in attachables such as clips, key chains and the like.

While the current description describes particular embodiments, one of ordinary skill in the art would recognize and understand that the technology described herein can be applied to any device capable of detecting the amount of UVA and UVB radiation experienced by a particular area or wearer of the detecting device.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a wearable device to, it should be readily understood that such features are not intended to be limiting.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations, in the drawings.

DETAILED DESCRIPTION

Presently described is a wearable device configured to monitor and track an individual's exposure to UV radiation. Without providing limitations to the current subject matter, the current subject matter can provide one or more non-limiting technical and health-related benefits. For example, the currently described subject matter can monitor and provide an indication of an individual's exposure to UV radiation, such as UVA radiation and/or UVB radiation. An individual's UV radiation exposure can be monitored over time to facilitate self-monitoring, reporting to health professionals, reporting to agencies, or the like. Furthermore, an individual can be provided with a notification when they have reached a determined threshold exposure for UV radiation over a defined period of time. The determined threshold exposure can be determined differently for each individual based on one or more characteristics of that individual. A notification or indication can be provided to inform an individual that they need to take corrective action with respect to their UV radiation exposure. Such corrective action can include applying sunscreen, covering with cloths, going indoors, or the like. Notifications can be provided that indicate the amount of UV radiation absorbed by an individual over a period of time and/or the intensity levels of UV radiation. Other advantages of the presently described subject matter include a system that provides easy access to information, provides effortless portability, is waterproof, facilitates the providing of a detailed and personalized profile of sun exposure and vitamin D tracking for one or more individuals, as well as providing many more features.

The currently described wearable device and/or software companion application can facilitate the education of people as to their exposure to UVA and UVB (collectively "UV") radiation. The currently described subject matter can facilitate people becoming more aware of their over-exposure to UV rays from the sun and in turn it help reduce the chances of developing various forms of skin cancer. A UV sensor embedded in the wearable can receive data from the UV Index. The wearable and/or companion application can alert the user as to when their burn rate time has been reached. A burn rate time is the time a wearer of the wearable can be exposed to UV radiation without taking mitigating actions. Mitigating actions can include putting on additional layers of clothing, moving out of UV radiation hot spots, applying additional sun protection and/or other protective measures. Information can be provided to the user about how to protect themselves properly from the sun's harmful rays. Data associated with the user and other factors can be collected.

Figure 1A:
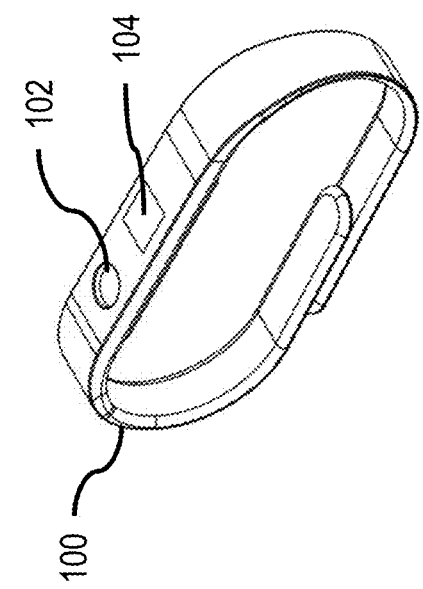
FIGS. 1A-1D illustrate a wearable device for monitoring radiation exposure of a wearer of the wearable device, the wearable device having one or more features consistent with the present description.
Figure 1B:
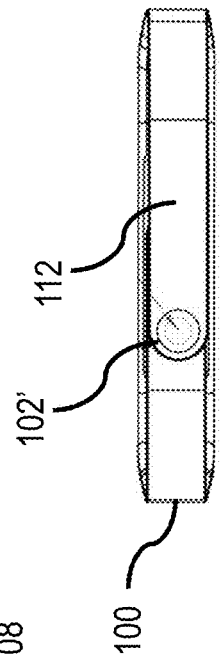
Figure 1C:
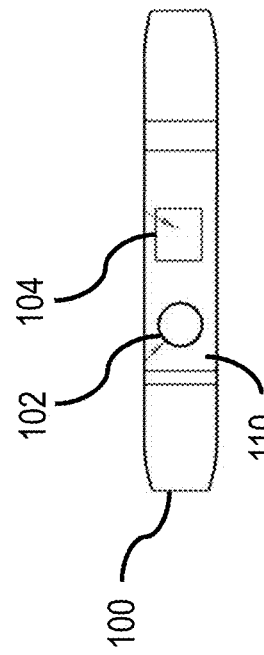
Figure 1D:
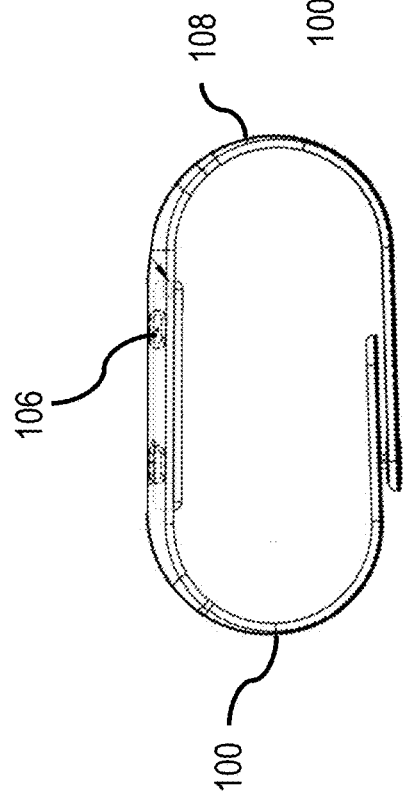

FIGS. 1A-1D illustrate a wearable device 100 for monitoring radiation exposure of a wearer of the wearable device 100, the wearable device 100 having one or more features consistent with the present description. The wearable device 100 can include a radiation sensor 102. The radiation sensor 102 can be configured to detect radiation incident on the sensor. The radiation can include ultraviolet (UV) radiation. UV radiation can include at least UVA radiation and UVB radiation. The wearable device 100 can include multiple radiation sensors 102. For example, FIG. 1D illustrates a second radiation sensor 102' on an opposite side of the wearable device 100 to radiation sensor 102. In the configuration of the wearable device 100 illustrated in FIGS. 1A to 1B a radiation sensor 102 is disposed at a superior portion 110 of the wearable device 100 and a radiation sensor 102' is disposed at the inferior portion 112 of the wearable device 100.

The radiation sensor(s) 102 can be configured to output a signal based on the instantaneous ultraviolet radiation detected at the radiation sensor.

The wireless device 100 can include an output device 104. The output device 104 can be configured to provide an alert to a wearer of the wearable device 100. The output device 104 can take any form. For example, the output device 104 can include one or more of a light (such as an LED), a display, a vibrating motor, an audio device, or the like.

The wearable device 100 can include one or more input buttons 106. The one or more input buttons 106 can be touch-sensitive buttons, push buttons, toggle switches or the like. The one or more input buttons 106 can be used to control one or more operations of the wearable device 100 as described further. The input buttons 106 can be selectable buttons, touch sensors or switches. The input devices 106 can facilitate turning the device On/Off, provide the user an UV protection, reset for a timer, to place the wearable in sleep mode and/or other functions. The buttons 106 can be configured to affect the functionality of the hardware on the wearable device. The buttons 106 can be configured to cause implementation of one or more functions associated with software executed on the wearable device 100. The input buttons 106 can be configured to push, touch, slide, rotate or toggle.

The wearable device 100 can include a securing device 108 configured to secure the wearable device 100 to a wearer. FIGS. 1A to 1D illustrate a wearable device 100 configured to be worn on a wrist of the wearer. The securing device 108 can be configured to secure the wearable device 100 to the wrist of a wearer, for example, by a wristband. FIGS. 1A to 1D are not intended to be limiting. In some variations, the wristband 108 can comprise an expandable wristband, a clasp 114, or other securing device. The clasp 114 can be a buckle, a snap, magnetic clasp, slide lock, toggle, or any other type of clasp.

The wearable device 100 can take many forms. For example, the wearable device 100 can be a ring, a bracelet, a watch, an anklet, a necklace, a brooch, a tag, a glove, a hat, an item of clothing, or the like. The technology and the functionality described in the present description can be included in shoes, helmets, or the like.

Figure 2:
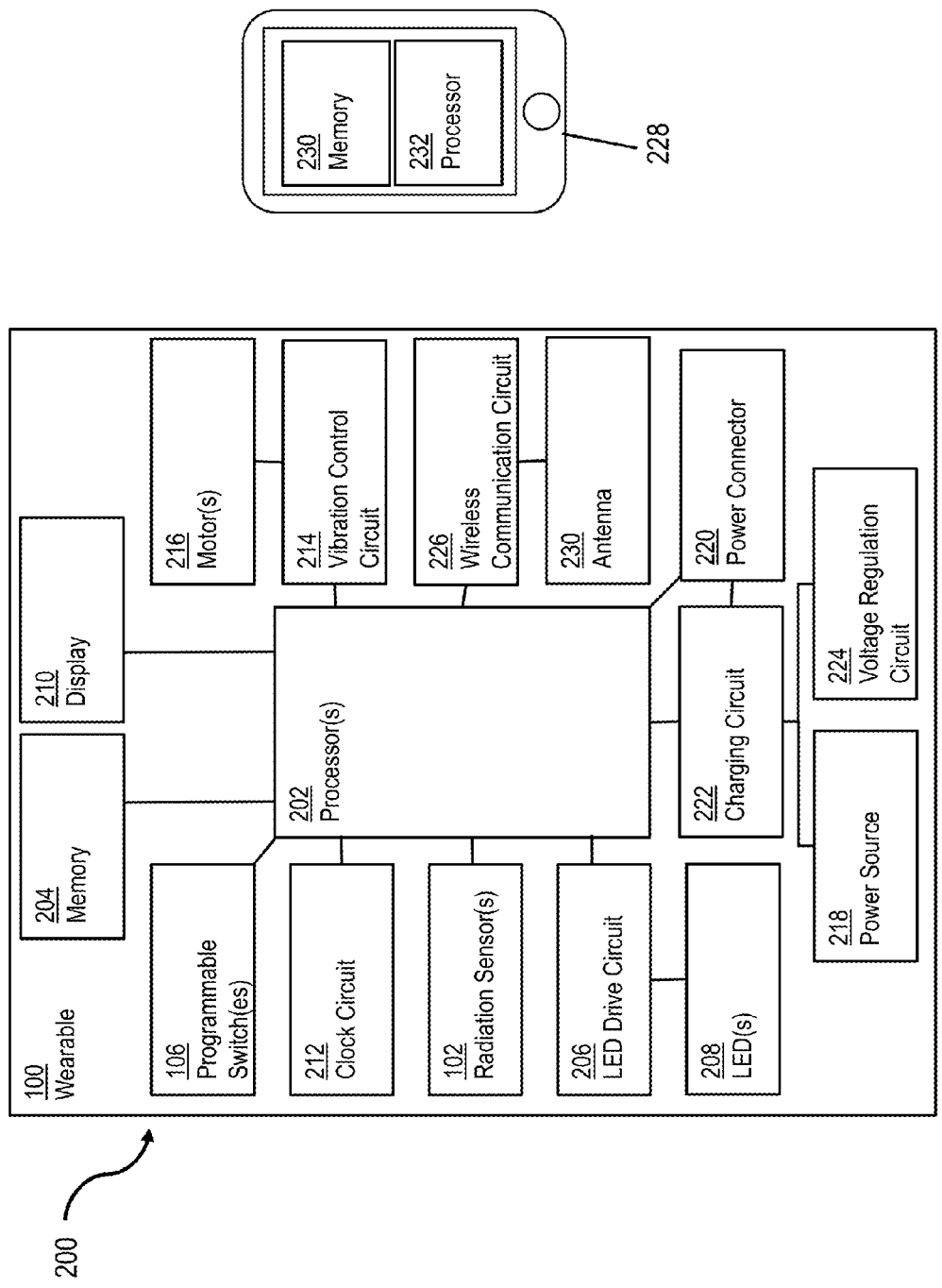
FIG. 2 is a schematic diagram of an electrical system for use with a wearable device 100, the electrical system having one or more elements consistent with the present description.

FIG. 2 is a schematic diagram of an electrical system 200 for use with a wearable device 100, the electrical system having one or more elements consistent with the present description. The electrical system 200 is not intended to be limiting. One or more of the elements of FIG. 2 may be incorporated into one or more other elements of FIG. 2. The functionality of one or more elements of FIG. 2 may be performed by one or more other elements.

The wearable device 100 can include a processor(s) 202. The processor(s) 202 can be configured to execute machine-readable instructions stored on a memory 204. The memory 204 can be configured to store machine-readable instructions for execution by the processor(s) 202. The memory 204 can be configured to store data associated with the functionality performed by and/or measurements obtained by one or more elements of the wearable device 100.

In some variations, the wearable device 100 can include a first circuit board. The wearable device 100 can include a second circuit board connected to the first circuit board. The second circuit board can be configured to facilitate wireless connectivity of the wearable device 100 with one or more remote devices 228. The first circuit board can be configured to facilitate processing and control. The processor(s) 202 can be an 8-bit processor, a 16-bit processor, a 32-bit processor, a 64-bit processor, or the like.

Providing a wearable device 100 having a first circuit board configured to perform the majority of the processing and a second circuit board configured to facilitate wireless connectivity for the wearable device 100 allows for the wireless communication technology components to be manufactured separately from the main circuit board.

The processing and control can include a haptic feedback/driver controller integrated circuit that is controllable through some 3wire or 2wires or 1wire communication protocols to generate unique haptic effects.

In some variations, the memory can be configured to store one or more wearer characteristics. The one or more wearer characteristics can include a burn rate for the wearer. The burn rate for the wearer can be based on a skin type of the wearer and/or a level of protection selected by the wearer. The level of protection selected by the wearer can indicate the level of sun protection that the wearer has applied to their skin, as further described herein. In some variations, the memory can be configured to store an amount of Vitamin D received by the wearer of the wearable device 100 over time.

The processor(s) 202 can be configured to execute machine readable instructions that cause the processor to perform one or more operations. The one or more operations can include storing, in the memory 204, information indicative of the instantaneous ultraviolet radiation detected, over time, at the radiation sensor(s) 102. The information indicative of the instantaneous ultraviolet radiation detected at the radiation sensor(s) 102 can be stored in the memory 204, as simple text, in a database format, in a spreadsheet format, and other data formats.

The processor(s) 202 can be configured to determine a total exposure, of the wearer, to ultraviolet radiation, based on monitoring, over time, the instantaneous UV radiation detected at the radiation sensor(s) 102. The total exposure of the wearer to UV radiation can be determined by summing the instantaneous exposure to UV radiation over time.

The wearable can include a clock circuit 212 configured to keep track of time. The clock circuit 212 can be capable of providing an accurate up-keeping of time based on, for example, a 32 Khz built-in oscillator.

The processor(s) 202 can be configured to determine whether the total exposure has reached a threshold amount. The determination can be based on one or more user characteristics stored in the memory 204. The threshold amount of exposure can be tailored to each individual wearer and can be based on a determined burn rate for the wearer.

The processor(s) 202 can be configured to cause the output device 104 to provide an alert to the wearer in response to determining that total exposure has reached the threshold amount of exposure to UV radiation. In some variations, the processor(s) 202 can be configured to instruct the LED drive circuit 206 to illuminate one or more LEDs 208 as the alert. For example, the LED(s) 208 can be configured to illuminate red in response to a determination, by the processor 202, that the wearer has been exposed to a threshold amount of UV radiation. In some variations, there may be more than one threshold amount of exposure that the processor(s) 202 determine. For example, a first threshold may be determined at which point the wearer would be notified that they are about to reach a second threshold and to take corrective action to protect themselves against UV radiation. In such a variation, the processor(s) 202 can be configured to instruct the LED drive circuit 206 to cause a different color LED 208 to illuminate, such as an orange LED, prior to illuminating a red LED at the next threshold.

The LED(s) 208 can be configured to outputs a variation of colors that correlate with the UV Index being detected at the radiation sensor(s) 102, the amount of time that the user has been exposed to UV radiation, the time that a user has left to be exposed to UV radiation before reaching a threshold level.

In some variations, the wearable device 100 can include one or more programmable switches 106. The programmable switch(es) 106 can include a tactile switch. The switch can be configured to awaken the wearable device 100 reset the wearable device 100 or used as an input option for the wearable device 100. The programmable switch(es) 106 can be configured to cause the wearable device 100 to perform one or more operations in response to a wearer engaging the programmable switch(s) 106. For example, in response to a wearer engaging the programmable switch(es) 106, the wearable device 100 can provide information to the wearer. For example, the LED drive circuit 206 can be configured to cause an LED 208 to illuminate having a color indicative of an amount of UV radiation that the wearer has already been exposed to. For example, a green LED may illuminate when the wearer has been exposed to less than a threshold amount of UV radiation exposure, an orange LED may illuminate when the wearer is close to a threshold amount of UV radiation exposure, and a red LED may illuminate when the wearer has been exposed to an excess of a threshold amount of UV radiation.

In some variations, the wearable device 100 may include a display 210. The wearable device 100 can be configured to present information on the display 210 in response to a wearer engaging the programmable swith(es) 106. For example, the wearable device 100 can be configured to present, through the display 210, information pieces to the wearer. Information pieces can include an amount of UV radiation that the wearer has been exposed to over a given period of time, an instantaneous UV radiation exposure, the current time, an amount of calories burned, number of steps taken, distance travelled, amount of time being exposed to UV radiation, or the like. In some variations, the wearable device 100 can be configured to display any number of information pieces to the wearer in response to repeated engagement of the programmable switch(es) 106.

In some variations, the alert provided by the wearable 100 in response to a determination by the processor(s) 202 that the wearer has been exposed to a threshold amount of UV radiation, can be a vibration. The processor(s) 202 can be configured to instruct the vibration control circuit 214 to engage a motor 216. The motor 216 can include a biased weight on the motor causing a vibration to be felt by the wearer. In some variations, the motor shaft can incorporate a biased weight. When the biased weight is rotated it causes a vibration that is noticeable by the wearer.

In some variations, the wearable device 100 can include a speaker configured to provide an audible alert to the wearer of the wearable device 100.

The wearable device 100 can include a power source 218. The power source 218 can include one or more batteries, capacitors, and/or other power sources. The power source 218 can be replenished by one or more of power delivered by a power connector 220. In some variations, the power source 218 can be replenished by replaceable batteries, power from a wireless or inductive charging pad, power from solar power charging and/or from heat released from the human skin surface, kinetic motion capture systems, and/or other power sources.

The wearable device 100 can include a charging circuit 222. The charging circuit 222 can be configured to facilitate charging and discharging of the power source 218. The charging circuit 222 can be configured to facilitate DC-DC buck boost or down, and output variable voltage. The charging circuit 222 can be configured to charge a single or double cell LiPo/LiON battery or any chemistry battery and provide operating power to the wearable device 100. The wearable device 100 can include temperature management of the battery.

A voltage regulation circuit 224 can protect the power source 218 and the rest of the circuitry of the wearable 100. The voltage regulation circuit 224 can be configured to provide varying voltage of electricity to the different elements of the wearable device 100. For example, the motor 216 may require a higher voltage than the processor(s) 202. The voltage regulation circuit 224 can be configured to provide higher voltage to the motor 216 and lower voltage to the processor(s) 202.

The wearable device 100 can include one or more communication devices. Communication to and from the device can be made in different formats: software to hardware, hardware to software, hardware-to-hardware, and software-to-software. The communication device can be a wired communication device and/or a wireless communication device.

In some variations, the wireless device 100 can include a wireless communication circuit 226. The wireless communication circuit 226 can be configured to communicate with one or more remote devices 228 through an antenna 230. The wireless communication circuit 226 can be configured to communicate through one or more protocols including Wi-Fi, Bluetooth, Bluetooth low energy and/or smart, NFC (Near field communication), RF (Radio Frequency), Fast Fourier audio signal analysis based hardware to and from the device or any device with an audio jack, USB based hardware communication, Sub-gigahertz, low power RF communication, Calibration, RFID, and/or GSM.

The wireless device 100 can be configured to communicate with third-party databases, remote databases, and the like. Communicating with third-party databases, remote databases, and the like, can facilitate sharing data to facilitate enhancing the algorithms used to monitor the wearer.

The wireless device 100 can be configured to communicate, through one or more remote devices 228, with the Internet and interact with API's on platform servers and/or third-party servers, with social networking servers operating social network sites, databases from medical, hospital or other organizations in the health and medical industry, and the like. Information shared over the Internet can be used to provide a personalized profile for the user with measurements such as heartbeat, skin deficiencies, medical deficiencies, and other data that is related to a person's likes, dislikes, habits, interests, health, fitness, and/or general wellbeing. Communication with weather forecasting databases and organizations, communication with geo-location databases and organizations, and government based API's can be performed to obtain information and create valuable information both for the company and the user, also to provide personal real time forecasts and calculations of weather and sun intensity to provide the user with a very personalized product and service.

The wearable device 100 can include a motion sensor. The motion sensor can be a 6 axis or a 9axis sensor in a single die comprising of an accelerometer, gyroscope and a magnetometer. The motion sensor can be composed of an independent accelerometer, gyroscope and magnetometer.

The remote device 228 may include electronic memory 230. The electronic memory 230 can be configured to store data received from the wearable device 100.

The wireless device 100 can be configured to communicate with a remote device 228 hosting a companion application for the wearable device 100. Alerts can be provided to the wearer of the wearable device 100 through the remote device 228. The electronic memory 228 can be configured to store a companion application for execution on the remote device 228. The remote device 228 can be a mobile computing device. For example, the remote device 228 can be a smartphone, tablet, laptop, netbook, or the like.

The wearable device 100 can be configured to provide an indication of the UV radiation incident on the radiation sensor(s) 102 of the wearable device 100. The radiation sensor(s) 102 can be configured to provide an output indicative of a UV reading based on the World Health Organization's adopted measure of UV indexing. The radiation sensor(s) 102 can be configured to decipher both UVA and UVB spectrums. The radiation sensor(s) can be configured to use a 1wire, 2wire, 3wire, or 4wire communication protocol.

In some variations, the wearable device 100 can provide a UV Index (UVI) to the remote device 228 for use by the companion application executed on a remote device 228. In some variations, the companion application can be configured to convert UV radiation information received from the wearable device 100 into one or other indexes indication the incident of UV radiation on the radiation sensor(s) 102.

The companion application can be configured to develop a user-specific algorithm by combining the current UVI level, a user's skin type, the preferred form of user sun protection, and/or the like. The preferred form of sun protection can include one or more of no sunscreen, 8 SPF, 10SPF, 15 SPF, 20 SPF, 25 SPF, 30 SPF, 35 SPF, 40 SPF, 45 SPF, 50 SPF, 55 SPF, & 60 SPF, clothing, and/or the like.

The remote device 228, can include a processor 232 and memory 230 storing machine-readable instructions, which when executed by the processor, cause the processor to perform one or more operations. The remote device 228 can be configured to facilitate selection and/or entry of a skin type by the wearer. Selection and/or entry of a skin type can be facilitated through the companion application running on the remote device 228. The skin type can be entered and/or selected by the user of the remote device 228. The skin type can be based on a standard scale, for example, the Fitzpatrick scale. In some variations, the companion application can be configured to cause a camera associated with the remote device 228 to obtain an image of the skin of a user. The companion application can direct the user how to position the camera and in what environmental settings the camera would need to be in. From the image, the remote device 228 can be configured to determine the skin type of the user.

The remote device 228 can be configured to facilitate selection and/or entry of a sun protection factor by the wearer. The sun protection factor can be a rating of a sun screen. The rating can be based on a standardized rating system, for example, the SPF rating system. A user may input into the remote device 228, using the companion application, an indication of a brand and name of a sun screen that they use.

The remote device 228, such as a mobile computing device, can be configured, using the processor 232, to determine a threshold amount of UV radiation that the wearer of the wearable device and/or the user of the remote device 228 can be exposed to and remain below a predetermined risk factor from having adverse affects from the UV radiation. This threshold is sometimes referred to as a personal burn rate of the wearer of the wearable device 100.

The remote device 228 can be configured to transmit to the wearable device 100 the threshold amount of ultraviolet radiation for the wearer for storing in the memory 204 of the wearable device. The threshold amount of ultraviolet radiation for the wearer can be stored in the memory 204 as a user characteristic.

In some variations, the remote device 228 can be configured to receive from the wearable device 100, data indicative of the instantaneous ultraviolet radiation detected, over time, at the radiation sensor(s) 102 of the wearable device 100. The remote device 228 can be configured to obtain a geographical location and time of day of the remote device 228. The remote device 228 can be configured to determine the geographical location of the remote device 228 using geolocation sensors, signal strength from wireless communication base stations, or the like.

The remote device 228 can be configured to obtain a determination of the UV radiation incident at the obtained geographical location at the obtained time of day. This information can be obtained using publicly available data. The publicly available data can take into account the angle of the Earth toward the Sun, the Earth's proximity to the Sun, weather at the location of the remote device 228, and/or other factors determining the incidence of UV radiation at the location of the remote device 228.

The remote device 228 can be configured to calibrate the radiation measurements obtained using the radiation sensor(s) 102 of the wearable device 100 based on the determined UV radiation incident at the obtained geographical location at the obtained time of day and the received instantaneous UV radiation incident on the radiation sensor(s) 102 of the wearable device 100.

The remote device 228 can be configured to determine a customized burn rate time can for the wearer of the wearable device 100. The customized burn rate time can be determined using the detected amount of UV radiation incident on the radiation sensor(s) 102 of the wearable device 100, the skin type of the wearer of the wearable device 100, the sun protection indicated as used by the wearer, or the like.

The customized burn rate can be transmitted from the remote device 228 to the wearable device 100. The wearable device 100 can use the customized burn rate to alert the wearer of the wearable device 100 when they have been exposed to a threshold amount of UV radiation and are required to take corrective action to avoid harm caused by the UV radiation.

In some variations, the companion application can be configured to present, on a graphical user interface of the remote device 228, a notification to the wearer when the wearer's burn rate is about to be reached. In some variations, a count-down timer can be provided indicating how long the wearer of the wearable 100 has to take protective action to avoid being harmed by UV radiation.

The companion application can be configured to accumulate data obtained by the wearable device 100 and/or the remote sensor(s) 102. Gathering of data about people, organizations, and/or other entities serves to not only facilitate the process by which the user-specific algorithms are developed, improved analysis, improved product, and improved service to the users but also the information gathered can be shared with third party entities. Such disclosure can comply with privacy requirements and other legal requirements. Some of the data that may be requested and collected and used is respective geo-location, age, gender, race, certain physical characteristics, deficiencies in the skin or other human organ, vitamin D intake, sun bathing time, risk factors, progress of skin damage, ailments, clinical symptoms, other health/wellbeing factors, and the like.

The wearable device 100 can include one or more biometric sensors. The one or more biometric sensors can be configured to detect physiological conditions of the wearer of the wearable device 100. The biometric sensors can include a motion sensor to determine movement of the wearable device, a gesture control sensor, a UV sensor, an ambient light sensor, a dust/particle sensor, a geo-location signal receiver, and/or other sensors. A motion sensor included in the wearable device 100 can include a three-axis motion sensor, six-axis motion sensor, nine-axis motion sensor, or the like. Measurements obtained by the motion sensor(s) disposed in the wearable device 100 can be used in the determination of a stride length of the wearer, a number of strides taken, a number of flights of stairs climbed, or the like.

The motion sensor(s) can include a gyroscope, a magnetometer, an accelerometer, an IMU (internal measure unit), an infrared based gesture sensor, an image sensor, and/or the like. The sensors can include an altimeter configured to detect a change in pressure at the wearable device 100. The change in pressure can indicate a change in elevation of the wearer of the wearable device 100

Other sensors disposed in the wearable device 100 can include a heart rate monitor for measuring the pulse of the wearer of the wearable device 100. A sensor can be disposed on the wearable device 100 configured to detect a change in electrical conductivity of the skin of the wearer. Through changes in electrical conductivity in the skin of the wearer the wearable device 100 can determine an amount of perspiration of the wearer.

Gesture control systems can be integrated into the wearable 100 to provide control and interaction with the hardware without the use of tactile or touch buttons. Such hardware can include the remote device 228 and one or more other devices. A gesture control system can be used to measure certain physiological aspects of the user. The gesture control system can be measured by a skin sensor, skin galvanic sensing unit, touch screen, or the like. Galvanic skin sensors and/or other sensors can be disposed in or on the wearable device 100 to determine the user's body temperature, stress levels, oxygen levels, and the like. Monitoring a rise in body temperature using galvanic skin sensors and a rise in their heart rate by using heart rate sensors can predict heat strokes.

In some variations, an ambient light sensor can be disposed in the wearable device 100. The ambient light sensor can be configured to adjust the brightness of LED's and/or the effectiveness of the UV sensor(s) 102. In some variations, the ambient light sensor can be an LED-based light sensor, a chip light sensor or the like.

In some variations, a skin sensor can be disposed into the wearable device 100.

The wearable device 100 can include a dust and particle sensor. The dust and particle sensor can be used to determine environmental quality. Measurements obtained by the dust and particle sensor can be used to determine sun intensity, air quality, the number of particles in the environment, pollution in the environment, and the like.

In some variations, a cleaning and/or auto-cleaning system can be integrated into the wearable device 100. The cleaning system can be adapted to clean a display of the wearable device. This cleaning system can include scratch and finger spot resistant material, anti-fingerprint coating, and a water, dirt and/or dust repellant coating.

The wearable device 100 can include a security system. The security system can be based on one or more biometric profiles of the owner of the wearable device 100. When a wearer wears the wearable device 100, the wearable device 100 can be configured to obtain biometric measurements of the wearer. The wearable device 100 can activate in response to the biometric measurements obtained from the wearer matching the biometric profile of the owner of the wearable device 100. The security system can further include a Sha 1 encryption chip, Sha 256 encryption chip for secure communication to and from a server, an encryption chip, or the like.

The wearable device 100 can include a tracking system. The tracking system can integrate with one or more geolocation sensors, GSM triangulation location systems, Internet-based location systems, or the like.

The antenna 230 can be integrated into the wearable device 100. The antenna 230 can include can be integrated into the wearable device 100 and can take the form of any shape, dimension, and material. Some examples of antennas include a hard material on PCB based PIFA antenna, a flexible PCB material PIFA or similar, and/or a metal based antenna molded with a plastic body.

The mobile application can be configured to facilitate a user taking a picture of any skin fragment(s) and share the picture with their personal dermatologists, other doctors, hospitals, organizations, clinics, private medical institutions, insurance companies, and other private or public entities.

Figure 3A:
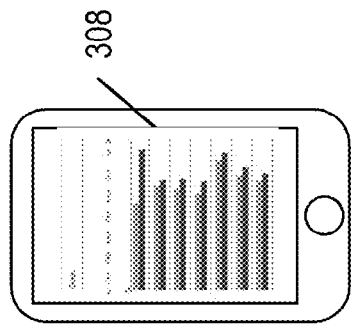
FIGS. 3A-3E illustrate examples of graphical user interfaces of a companion application for a system having one or more features consistent with the present description.

FIGS. 3A-3E illustrate examples of graphical user interfaces of a companion application for a system having one or more features consistent with the present description. FIG. 3A illustrates a graphical user interface 302 of a profile page of the companion application. The profile page can be populated by a user providing personal information such as age, gender, date of birth, skin type, preferred sunscreen used by the user, eye color, if currently or previously a victim of skin cancer or any skin deficiency and/or the like.

The mobile application can cause the mobile device to use a user's personal information to develop a user-specific algorithm that takes these factors into consideration and combines it with the UV Index to create a safe exposure timer countdown for the user. For example, the user-specific algorithm can be used to alert the user in response to the wearable device 100 and/or companion application running on the remote device 228 determining that the wearer of the wearable device 100 has been exposed to a threshold amount of UV radiation. A UV index due to sunlight exposure can be determined as previously described. The information provided by the user can be used to create a time range that the user can remain being exposed to that level of sunlight. The wearable device 100 and/or the software application running on the remote device 228 can be configured to alert user once the timer runs out and/or a time before the timer runs out to warn the user that their time in the sunlight is running out without applying additional sun protectant.

Figure 3B:
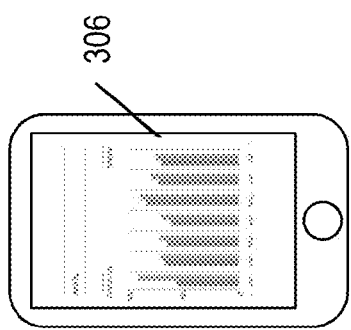

FIG. 3B illustrates a graphical user interface 304 providing an indication of the amount of UV exposure and Vitamin D received from sunlight by the wearer of the wearable device 100 over time.

Figure 3C:
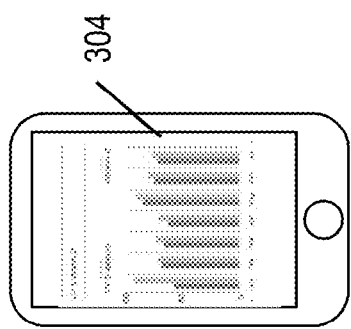

FIG. 3C illustrates a graphical user interface 306 providing an indication of the amount of activity performed by the user over time. The one or more activities monitored by the wearable device 100 can include walking, running, swimming, bicycling, conditioning exercise, hiking, weight training, CrossFit, and other exercise activities.

Figure 3D:
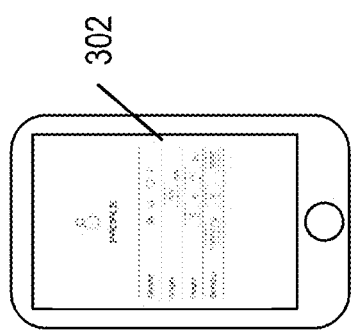

FIG. 3D illustrates a graphical user interface 308 providing an indication of the amount of sleep of the wearer of the wearable device 100 detected by the wearable device 100 over time.

Figure 3E:
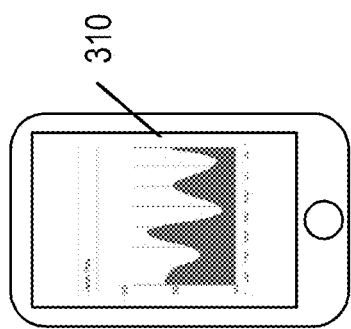

FIG. 3E illustrates a graphical user interface 310 providing an indication of the monitored heart rate of the wearable device 100 over time. The heart rate sensor can be integrated to the bottom of the PCB which connects to the user's wrist through the bottom of a housing. The heart rate sensor can be integrated into the strap. Alerts can be provided based on the user's weight, height, and age when the user's heart rate gets too high or too low.

Figure 4D:
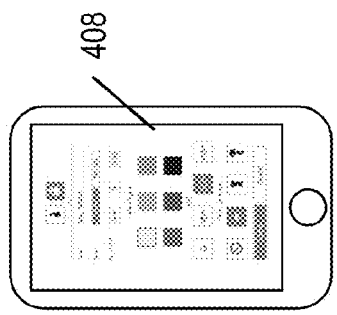
FIGS. 4A-4E illustrate examples of graphical user interfaces of a companion application for a system having one or more features consistent with the present description; and, FIG. 5 is an illustration of a method having one or more features consistent with the present description.
Figure 4C:
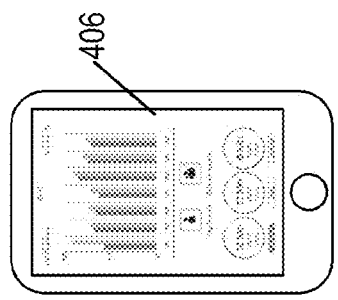
Figure 4B:
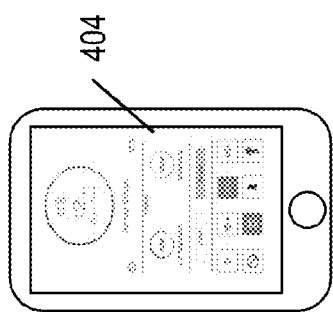
Figure 4A:
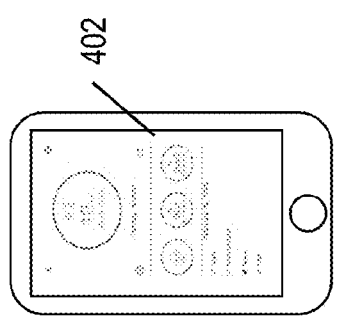

FIGS. 4A-4F illustrate examples of graphical user interfaces of a companion application for a system having one or more features consistent with the present description. FIG. 4A illustrates a graphical user interface 402 providing a burn time for the wearer of the wearable device 100. The graphical user interface 402 can be configured to display one or more additional pieces of information associated with the biometric information obtained by the wearable device 100. For example, the graphical user interface 402 can include a distance moved by the wearer of the wearable device 100, the number of calories burned by the wearer of the wearable device 100, the quality of sleep experienced by the wearer of the wearable device 100, or the like.

FIG. 4B illustrates a graphical user interface 404 for providing information to the wearer of the wearable device 100 and/or facilitating selection and/or entry of one or more parameters by the user of the remote device 228. The graphical user interface 404 can include an indication of an amount of UV exposure for the wearer of the wearable device 100. The amount of UV exposure can be provided in the form of a percentage of the total amount of UV exposure that is below a threshold for that wearer. The graphical user interface 404 can include an indication of an amount of Vitamin D received by the wearer of the wearable device 100.

The graphical user interface 404 can include one or more options for selection by the user of the remote device 228 for sun protection used by the wearer of the wearable device 100. For example, the user of the remote device 228 can select a strength of the sunscreen applied to the wearer of the wearable device 100. The user of the remote device 228 can select a level of clothing worn by the wearer of the wearable device 100.

FIG. 4C illustrates a graphical user interface 406 for providing information to the wearer of the wearable device 100. The user of the remote device 100 can integrate and manage multiple users in the application. The graphical user interface 406 can provide an indication of the UV exposure and burn rate time for multiple wearers of wearable devices 100. For example, a parent can include the profiles of their children and see the UV exposure for each child wearing a wearable device 100 and each the burn time for each of their children. In some variations, the UV exposure of the multiple users can be based on the UV exposure detected at a single wearable device 100 worn by a single wearer. In some variations, the UV exposure of the multiple users can be based on the UV exposure detected at multiple individual wearable devices 100. Each wearable device 100 and/or wearer of the wearable device 100 can include its own profile in the application. Each user can set their profile to pair to each of their respective hardware devices.

FIG. 4D illustrates a graphical user interface 408 for providing information to the wearer of the wearable device 100. The graphical user interface 408 can facilitate entry and/or selection of a skin type for each wearer subaccount, a level of protection of the sun screen used for the wearer, a level of clothing worn by the wearer, and the like.

In some variations, the mobile application can include a page for donations to a desired non-profit organization. The mobile application can facilitate users to be able to donate directly to different organizations. For example, skin cancer non-profit organizations and/or research organizations, and the like.

Figure 4E:
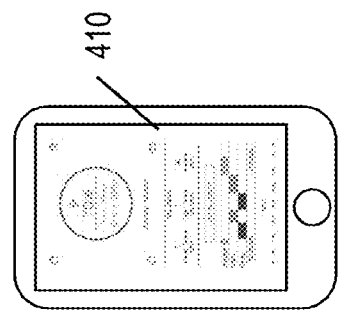

FIG. 4E illustrates a graphical user interface 410 for providing information to the wearer of the wearable device 100. Graphical user interface 410 can include an indication of the quality of sleep experienced by the wearer of the wearable device 100. Different types of sleep can be tracked and illustrated on the graphical user interface 410.

The presently described wearable and companion application can be used for animals as well as humans.

Figure 5:
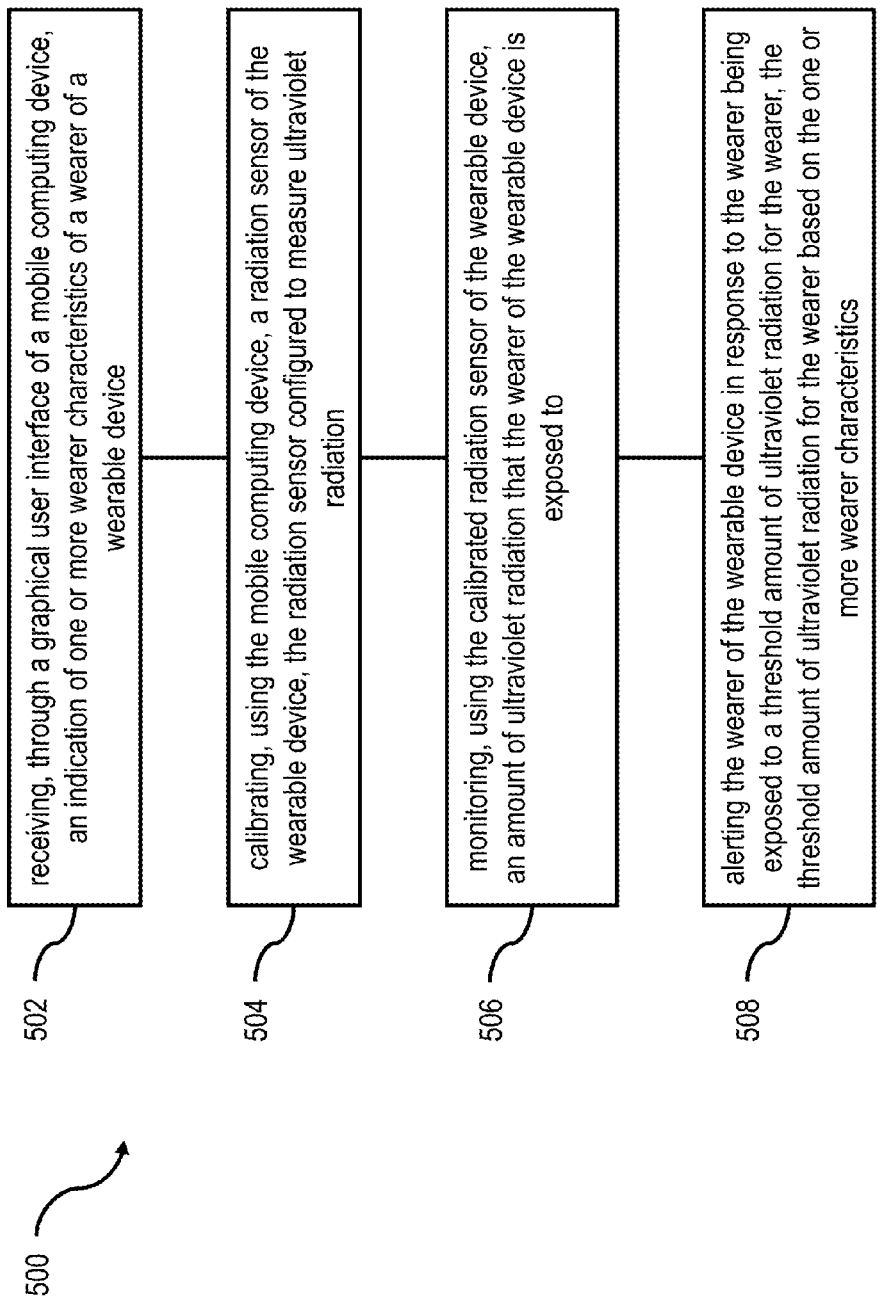

FIG. 5 is an illustration of a method 500 having one or more features consistent with the present description. Method 500 can be performed by one or more elements illustrated in FIGS. 1A-1D and FIG. 2.

At 502, an indication of one or more wearer characteristics of a wearer of a wearable device can be received. The indication of the one or more wearer characteristics can be received through a graphical user interface of a mobile computing device. The one or more wearer characteristics can include an indication of a skin type of a wearer of a wearable device, an indication of a level of sun protection worn by the wearer of the wearable device, an indication of the clothes worn by the wearer of the wearable device, and/or the like.

At 504, a radiation sensor of the wearable device can be calibrated using the mobile computing device. The radiation sensor can be configured to measure ultraviolet radiation. Calibrating the radiation sensor can include obtaining a location of the mobile computing device; obtaining an indication of the amount of ultraviolet radiation incident at the location of the mobile computing device; receiving an indication of the amount of ultraviolet radiation incident on the radiation sensor; and, determining a calibration amount for the radiation sensor of the wearable device based on the obtained indication of the amount of ultraviolet radiation incident at the location of the mobile computing device.

At 506, an amount of ultraviolet radiation that the wearer of the wearable device is exposed to can be monitored using the calibrated radiation sensor of the wearable device.

At 508, the wearer of the wearable device can be provided an alert in response to the wearer being exposed to a threshold amount of ultraviolet radiation for the wearer. The threshold amount of ultraviolet radiation for the wearer can be based on the one or more wearer characteristics.

While features are described herein with respect to individual components, one of ordinary skill in the art will appreciate and understand that the functionality attributable to an individual component can be provided by other components herein described, components not described herein but contemplated by the current subject matter, and/or by a combination of components.

One or more aspects or features of the subject matter described herein can be realized in digital electronic circuitry, integrated circuitry, specially designed application specific integrated circuits (ASICs), computer hardware, firmware, software, and/or combinations thereof. These various aspects or features can include implementation in one or more computer and/or software programs that are executable and/or interpretable on a programmable system including at least one programmable processor, which can be special or general purpose, coupled to receive data and instructions from, and to transmit data and instructions to, another program, device, and/or storage system.

In addition, the logic flows depicted in the accompanying figures and/or described herein do not necessarily require the particular order shown, or sequential order, to achieve desirable results. Other implementations may be within the scope of the following claims.

What is claimed is:

1. A system to monitor radiation exposure of a wearer of a wearable device, the system comprising:
   a mobile computing device operatively coupled to a processor of the wearable device, the mobile computing device comprising a graphical user interface configured to provide an indication of one or more wearer characteristics of a wearer wearing the wearable device;
   the wearable device comprising:
   a radiation sensor configured to measure ultraviolet radiation and output a signal based on an instantaneous ultraviolet radiation detected at the radiation sensor;
   an output device configured to provide an alert to the wearer of the wearable device;
   a memory, the memory configured to store one or more wearer characteristics; and,
   the processor configured to execute machine readable instructions that cause the processor to:
      calibrate the radiation sensor using the mobile computing device by
         obtaining, at the mobile computing device, a location of the mobile computing device;
         obtaining, at the mobile computing device, an indication of an amount of ultraviolet radiation incident at the location of the mobile computing device, the indication based on weather at the location of the mobile computing device, a distance between the Earth and the Sun, and/or an angle of the Earth-axis with respect to the Sun;
         receiving, at the mobile computing device from the wearable device, an indication of the amount of ultraviolet radiation incident on the radiation sensor; and,
         determine, at the mobile computing device, a calibration amount for the radiation sensor of based on the obtained indication of the amount of ultraviolet radiation incident at the location of the mobile computing device
      store, in the memory, information indicative of the instantaneous ultraviolet radiation detected at the radiation sensor over time;
      determine a total exposure, of the wearer, to ultraviolet radiation based on monitoring the signal from the radiation sensor;
      determine, based on the one or more wearer characteristics, whether the total exposure has reached a threshold amount of exposure to ultraviolet radiation; and,
      cause the output device to provide the alert to the wearer in response to determining that the total exposure has reached the threshold amount of exposure to ultraviolet radiation.

2. The system of claim 1, wherein the one or more wearer characteristics include a burn rate for the wearer.

3. The system of claim 1, wherein the output device includes a light.

4. The system of claim 1, wherein the output device includes a display.

5. The system of claim 1, wherein the output device includes a vibrating motor.

6. The system of claim 1, the wearable device further comprising a heart rate monitor.

7. The system of claim 1, the wearable device further comprising one or more movement sensors.

8. The system of claim 1, the wearable device further comprising a location sensor.

9. The system of claim 1, the wearable device further comprising:
   a strap; and,
   a battery disposed within the strap.

10. The system of claim 1, the wearable device further comprising a short-range transceiver configured to transmit and receive data with lithe mobile computing device.

11. The system of claim 10, wherein the mobile computing device is configured to:
    store data received from the wearable device; and,
    facilitate presenting the data received from the wearable device to a medical service provider.

12. The system of claim 10, wherein the mobile computing device comprises:
    a processor; and,
    a memory storing machine-readable instructions, which when executed by the processor, cause the processor to perform one or more operations, the operations comprising:
      facilitate selection and/or entry of a skin type by the wearer;
      facilitate selection and/or entry of a protection factor by the wearer; and,
      determine the threshold amount of exposure to ultraviolet radiation for the wearer.

13. The system of claim 12, wherein the operations further comprise: transmitting, from the mobile computing device to the wearable device, the threshold amount of exposure to ultraviolet radiation for the wearer for storing in the memory of the wearable device as a user characteristic.

14. The system of claim 12, wherein the operations further comprise: receiving, at the mobile computing device from the wearable, data indicative of the instantaneous ultraviolet radiation detected at the radiation sensor of the wearable device over time.

15. The system as in claim 14, wherein the operations further comprise: determining, at the mobile computing device, an amount of Vitamin D received by the wearer, the determining based on the received data from the wearable device over time.

16. The system as in claim 12, wherein the operations further comprise:
    obtaining, by the mobile computing device, the location and a time of day associated with the mobile computing device;
    obtaining, at the mobile computing device, a determination of an amount of UV radiation incident at the obtained location and at the obtained time of day; and,
    facilitating, by the mobile computing device, calibration of the radiation sensor at the wearable device based on the obtained determination of UV radiation incident at the obtained location and at the obtained time of day.

17. A method comprising:
    receiving, through a graphical user interface of a mobile computing device, an indication of one or more wearer characteristics of a wearer of a wearable device;
    calibrating, using the mobile computing device, a radiation sensor of the wearable device, the radiation sensor configured to measure ultraviolet radiation, calibrating the radiation sensor comprising:
      obtaining, at the mobile computing device, a location of the mobile computing device;
      obtaining, at the mobile computing device, an indication of an amount of ultraviolet radiation incident at the location of the mobile computing device, the indication based on weather at the location of the mobile computing device, a distance between the Earth and the Sun, and/or an angle of the Earth-axis with respect to the Sun;

receiving, at the mobile computing device from the wearable device, an indication of the amount of ultraviolet radiation incident on the radiation sensor; and, determining, at the mobile computing device, a calibration amount for the radiation sensor of the wearable device based on the obtained indication of the amount of ultraviolet radiation incident at the location of the mobile computing device;

monitoring, using the calibrated radiation sensor of the wearable device, an amount of ultraviolet radiation that the wearer of the wearable device is exposed to; and, alerting the wearer of the wearable device in response to the wearer being exposed to a threshold amount of ultraviolet radiation, the threshold amount of ultraviolet radiation based on the one or more wearer characteristics.

18. The method of claim 17, wherein the one or more wearer characteristics comprise an indication of a skin type of the wearer of a wearable device.

19. The method of claim 17, wherein the one or more wearer characteristics comprise an indication of a level of sun protection worn by the wearer of the wearable device.

* * * * *